United States Patent Office.

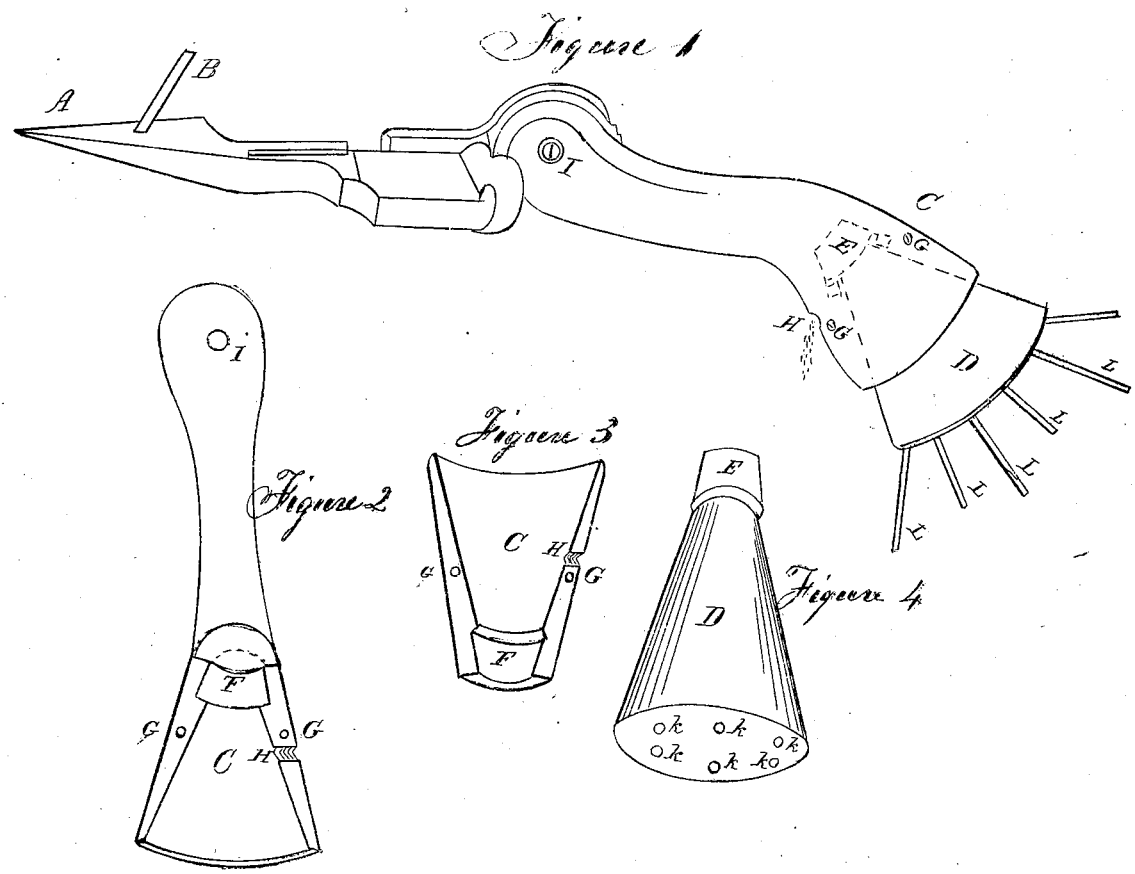

NATHAN STONECIPHER, OF CAMBRIDGE CITY, INDIANA.

Letters Patent No. 79,609, dated July 7, 1868.

---

IMPROVEMENT IN TRACK-CLEARERS FOR HARVESTERS.

---

The Schedule referred to in these Letters Patent and making part of the same.

---

TO ALL WHOM IT MAY CONCERN:

Be it known that I, NATHAN STONECIPHER, of Cambridge City, Wayne county, Indiana, have invented new and useful Improvements in Track-Clearers for Grain and Grass-Harvesters.

My improvements consist in attaching to the back of the dividing-point a crooked arm, provided with a socket and tail-piece, which is cone-shaped, having at its small end a projection, which fits into recesses at the front end of the sockets, and also providing the dividing-point with an upright knife for cutting the tangled grass, and also providing a hole at the bottom of the socket for the dust to pass out, as I do not design to use grease or oil on my revolving cone.

To enable others skilled in the art to make and use my invention, I will proceed to describe its construction and operation; and I do hereby declare that the following is a full, clear, and exact description thereof, reference being had to the accompanying drawings, and to the letters of reference marked thereon.

Figure 1 is a perspective view of my track-clearer.
Figure 2 is a sectional view of the socket.
Figure 3, the other half of the socket.
Figure 4 is the revolving cone.
A, in fig. 1, is the dividing-point.
B, in fig. 1, the upright knife.
C, in fig. 1, the socket, also seen at figs. 2 and 3.
D is the revolving cone, also seen at fig. 4.
E is the projection, at front end of cone D, also shown at fig. 4.
F, in figs. 2 and 3, forms the socket for the projection E, and holds it secure from coming out, while it revolves freely.
G G, in figs. 2 and 3, are holes, through which screws are inserted to hold the two pieces together to form the socket.
G G, in fig. 1, shows the screws, which hold them together.
H, in fig. 1, is a hole to let the dust pass out, also shown in figs. 2 and 3.
I, in fig. 1, shows where the arm of the socket is secured to the back end of the dividing-point or finger-bar by means of a bolt or screw.
I, in fig. 2, a hole for inserting bolt or screw.
K K K K K K are holes in the back end of the revolving cone to receive the sticks L L L L L L, as shown in fig. 1.

The knife B should be made of good steel, about one and a half inch wide, and sufficiently high to cut any tangled grass, and should be firmly secured back of and on top of the dividing-point.

I make the socket C and its arm of cast iron.

I also make the cone D of cast iron, and insert it between the two halves of the socket C, which are firmly secured together by means of screws, as seen at G G in fig. 1.

The sticks L L, shown in fig. 1, should be secured in the holes K K, as seen in fig. 4, and be sufficiently long to throw the grass out of the track, and they should be set at a proper angle, that the ends will catch and turn the cone D. Said sticks should be bent at the outer ends.

The joint I should be loose, so as to allow the arm of the socket to rise and fall freely.

*Operation.*

It will be seen that, as the dividing-point moves forward, the knife B will cut any tangled grass which it may come in contact with. And the cone D being set at an obtuse angle with the line of the dividing-point, the sticks L L L having their ends on the ground as the point moves forward, the cone D will turn around and throw the grass from the track.

I will here state that I am aware that rolling cones have been used for the purpose, revolving on an axis passing through a hole in the centre, and furnished with a joint-clearer to prevent the grass winding around the axle. I do not claim any of those devices separately, or as used by Abner Whiteley; but What I do claim as my invention, and desire to secure by Letters Patent, is—

The combination of the revolving cone D and socket C, when used as a track-clearer, in combination with a grain or grass-cutter, the whole being constructed, arranged, and operated substantially as above described.

NATHAN STONECIPHER.

Witnesses:
    THOS. A. DUGDALE,
    JAMES HUGHES.